US012643601B2

(12) United States Patent
Nehls et al.

(10) Patent No.: US 12,643,601 B2
(45) Date of Patent: **\*Jun. 2, 2026**

(54) STEER-BY-WIRE SYSTEM AND METHOD FOR OPERATING A STEER-BY-WIRE SYSTEM

(71) Applicant: Ford Global Technologies, LLC, Dearborn, MI (US)

(72) Inventors: Oliver Nehls, Düsseldorf (DE); Sergio Codonesu, Aachen (DE); Jan Bremkens, Straelen (DE); Alexander Ein Waldt, Cologne (DE)

(73) Assignee: Ford Global Technologies, LLC, Dearborn, MI (US)

( \* ) Notice: Subject to any disclaimer, the term of this patent is extended or adjusted under 35 U.S.C. 154(b) by 56 days.

This patent is subject to a terminal disclaimer.

(21) Appl. No.: 18/912,821

(22) Filed: Oct. 11, 2024

(65) Prior Publication Data

US 2025/0033697 A1     Jan. 30, 2025

Related U.S. Application Data

(63) Continuation of application No. 17/986,094, filed on Nov. 14, 2022, now Pat. No. 12,145,673.

(30) Foreign Application Priority Data

Dec. 6, 2021    (DE) ......................... 102021132052.6

(51) Int. Cl.
    *B62D 6/00*        (2006.01)
    *B62D 5/04*        (2006.01)
(52) U.S. Cl.
    CPC ........... *B62D 6/008* (2013.01); *B62D 5/0463* (2013.01)

(58) Field of Classification Search
    CPC ........ B62D 5/005; B62D 5/006; B62D 6/008; B62D 5/0463; B62D 5/001; B62D 5/0475; B62D 6/001
    See application file for complete search history.

(56) References Cited

U.S. PATENT DOCUMENTS 11,052,940 B1     7/2021  Narasimhan et al.
12,454,312 B1 \* 10/2025  Abuaita ................. B62D 5/001
(Continued)

FOREIGN PATENT DOCUMENTS

DE        102014016017 B4      8/2017
DE        102017201357 A1      8/2018
(Continued)

*Primary Examiner* — Sizo B Vilakazi
(74) *Attorney, Agent, or Firm* — Lorne Forsythe; Price Heneveld LLP

(57)        ABSTRACT

A steer-by-wire system for a land vehicle, having a steering wheel, a feedback actuator, a detection device equipped to detect a driver's intention to enter the vehicle and/or a driver's intention to exit the vehicle, and an electronic control system, which, following detection of the intention to enter the vehicle and/or the intention to exit the vehicle controls the feedback actuator to hold the steering wheel in a predetermined rotational position by generating a holding torque. When an actuating torque which exceeds the holding torque is applied manually to the steering wheel and the steering wheel is rotated out of the predetermined rotational position, the electronic control system continuously approximates a turning angle of the predetermined rotational position to a turning angle of a current rotational position of the steering wheel using a specified time-based adjustment function based on a difference between the actuating torque and the holding torque.

14 Claims, 2 Drawing Sheets

(56)                    References Cited

U.S. PATENT DOCUMENTS

| | | | |
|---|---|---|---|
| 2019/0092376 A1* | 3/2019 | Panse ..................... | B60R 25/02 |
| 2020/0239061 A1* | 7/2020 | Zheng ................... | B62D 5/046 |
| 2020/0283063 A1* | 9/2020 | Kashi ................... | B62D 6/003 |
| 2022/0266901 A1* | 8/2022 | Kim ...................... | B62D 6/008 |
| 2022/0289277 A1 | 9/2022 | Narasimhan et al. | |
| 2023/0174149 A1 | 6/2023 | Nehls et al. | |
| 2025/0026396 A1* | 1/2025 | Soderlind ............. | B62D 1/183 |
| 2025/0249949 A1* | 8/2025 | Battlogg ............... | B62D 5/006 |

FOREIGN PATENT DOCUMENTS

| | | | |
|---|---|---|---|
| DE | 102019216282 A1 | 6/2020 |
| DE | 102020100789 A1 | 11/2020 |
| DE | 102019213821 A1 | 3/2021 |

* cited by examiner

STEER-BY-WIRE SYSTEM AND METHOD FOR OPERATING A STEER-BY-WIRE SYSTEM

CROSS-REFERENCE TO RELATED APPLICATIONS

This application is a continuation of U.S. application Ser. No. 17/986,094, filed on Nov. 14, 2022, now U.S. Pat. No. 12,145,673 B2, entitled "STEER-BY-WIRE SYSTEM AND METHOD FOR OPERATING A STEER-BY-WIRE SYSTEM," which application claimed foreign priority benefits under 35 U.S.C. § 119(a)-(d) to German Patent Application No. 102021132052.6 filed on Dec. 6, 2021, the disclosures of which are hereby incorporated by reference in their entirety.

FIELD OF THE DISCLOSURE

The present disclosure generally relates to a steer-by-wire system for a land vehicle equipped to electrically control a feedback actuator to hold the steering wheel in a predetermined rotational position by generating a holding torque, and a method for operating a steer-by-wire system of a land vehicle.

BACKGROUND OF THE DISCLOSURE

In a land vehicle with a conventional steering system, resetting forces of the road wheels generally generate a holding torque which is transmitted to the steering wheel via the mechanical connection between the road wheels and the steering wheel. A resistive torque is thus generated at the steering wheel, which supports a driver entering the land vehicle and exiting the land vehicle if the driver pulls on the steering wheel or holds onto the steering wheel while doing so.

In a steer-by-wire system of a land vehicle, there is no such mechanical connection between the steering wheel and the steerable road wheels. If a steer-by-wire system furthermore has no steering column lock, which is generally no longer needed in a steer-by-wire system, the steering wheel may rotate freely in a parked state of the land vehicle and therefore may not provide an adequate resistive torque to counter an actuating torque applied to the steering wheel by a driver who wishes to use the steering wheel for support when entering the vehicle or exiting the vehicle.

It would be desirable to provide a steer-by-wire system for a land vehicle, which provides an enhanced comfort level.

SUMMARY OF THE DISCLOSURE

According to a first aspect of the present disclosure, a steer-by-wire system for a vehicle is provided. The steer-by-wire system includes a steering wheel, a feedback actuator connected to the steering wheel, and a detection device equipped to detect a driver's intention to enter the vehicle and/or a driver's intention to exit the vehicle. The steer-by-wire system also includes an electronic control system, which, following detection of the intention to enter the vehicle and/or the intention to exit the vehicle, is equipped to electrically control the feedback actuator to hold the steering wheel in a predetermined rotational position by generating a holding torque, wherein when an actuating torque which exceeds the holding torque is applied manually to the steering wheel and the steering wheel is consequently rotated out of the predetermined rotational position, the electronic control system is equipped to continuously approximate a turning angle of the predetermined rotational position to a turning angle of a current rotational position of the steering wheel using a specified time-based adjustment function on the basis of a difference between the actuating torque and the holding torque.

According to a second aspect of the present disclosure, a steer-by-wire system for a land vehicle is provided. The steer-by-wire system includes a steering wheel, a feedback actuator connected to the steering wheel, and a detection device equipped to detect a driver's intention to enter the vehicle and/or a driver's intention to exit the vehicle. The steer-by-wire system also includes an electronic control system, which, following detection of the intention to enter the vehicle and/or the intention to exit the vehicle, is equipped to electrically control the feedback actuator to hold the steering wheel in a predetermined rotational position by generating a holding torque, wherein when an actuating torque which exceeds the holding torque is applied manually to the steering wheel and the steering wheel is consequently rotated out of the predetermined rotational position, the electronic control system is equipped to continuously approximate a turning angle of the predetermined rotational position to a turning angle of a current rotational position of the steering wheel using a specified time-based adjustment function on the basis of a difference between the actuating torque and the holding torque, wherein following detection of the driver's intention to enter the vehicle and/or the driver's intention to exit the vehicle, the electronic control system is equipped to set a current rotational position of the steering wheel as a predetermined rotational position, and wherein following detection of the driver's intention to enter the vehicle and/or the driver's intention to exit the vehicle, the electronic control system is equipped to set a rotational position of the steering wheel which is associated with a current steering position of at least one steerable road wheel of the land vehicle as a predetermined rotational position.

According to a third aspect of the present disclosure, a method for operating a steer-by-wire system of a vehicle is provided. The method includes the steps of detecting a driver's intention to enter the vehicle and/or a driver's intention to exit the vehicle, and following detection of the intention to enter the vehicle and/or the intention to exit the vehicle, holding a steering wheel of the steer-by-wire system in a predetermined rotational position by use of a feedback actuator of the steer-by-wire system through the generation of a holding torque, which feedback actuator is connected to the steering wheel. The method also includes the step of when an actuating torque which exceeds the holding torque is applied manually to the steering wheel and the steering wheel is consequently rotated out of the predetermined rotational position, continuously approximating a turning angle of the predetermined rotational position to a turning angle of a current rotational position of the steering wheel using a specified time-based adjustment function on the basis of a difference between the actuating torque and the holding torque.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

In the different figures, the same parts are denoted by the same reference signs and are therefore generally also only described once.

Figure 1:
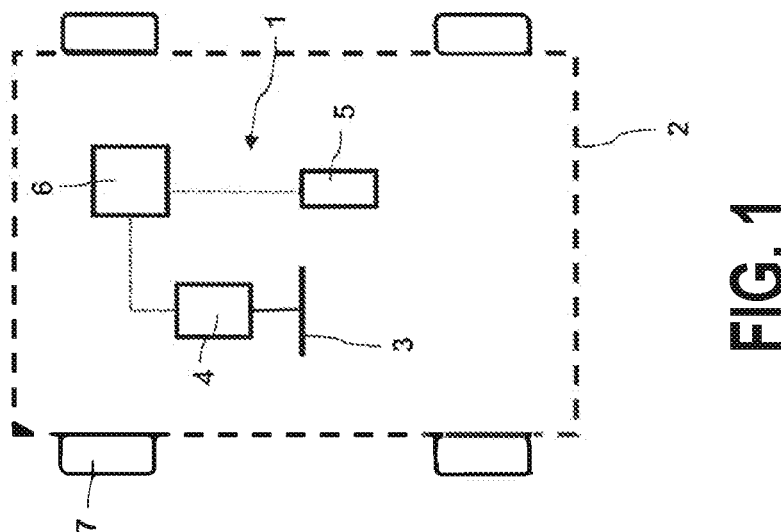
FIG. 1 is a schematic illustration of a vehicle having a steer-by-wire system, according to an exemplary embodiment.

FIG. 1 shows a schematic illustration of an exemplary embodiment of a steer-by-wire system 1 equipped onto a land vehicle 2. The land vehicle 2 may be an automobile or motor vehicle for transporting passengers and items or a utility vehicle, for example. According to the example shown, the land vehicle 2 may include a plurality of road wheels including at least one steerable road wheel 7 steering in response to actuation of the steer-by-wire system 1.

The steer-by-wire system 1 has a steering wheel 3, a feedback actuator 4 connected to the steering wheel 3, and a detection device 5, which is equipped to detect a driver's intention to enter the vehicle and/or a driver's intention to exit the vehicle, which driver is not shown in the figures. Furthermore, the steer-by-wire system 1 has an electronic control system 6, which, following detection of the intention to enter the vehicle and/or the intention to exit the vehicle, is equipped to electrically control the feedback actuator 4 in such a way that the feedback actuator 4 holds the steering wheel 3 in a predetermined rotational position by generating a holding torque.

When an actuating torque which exceeds the holding torque is applied manually to the steering wheel 3 and the steering wheel 3 is consequently rotated out of the predetermined rotational position, the electronic control system 6 is equipped to continuously approximate a turning angle of the predetermined rotational position to a turning angle of a current rotational position of the steering wheel 3 using a specified time-based adjustment function on the basis of a difference between the actuating torque and the holding torque.

To this end, following detection of the driver's intention to enter the vehicle and/or the driver's intention to exit the vehicle, the electronic control system 6 is equipped to set a rotational position of the steering wheel 3 which is associated with a current steering position of at least one steerable road wheel 7 of the land vehicle 2 as a predetermined rotational position. Alternatively, following detection of the driver's intention to enter the vehicle and/or the driver's intention to exit the vehicle, the electronic control system 6 may be equipped to set a current rotational position of the steering wheel 3 as a predetermined rotational position.

After the approximation of the predetermined rotational position to the current rotational position and when the actuating torque is no longer applied to the steering wheel 3, the electronic control system 6 is furthermore equipped to continuously approximate the turning angle of the current predetermined rotational position to the turning angle of the original predetermined rotational position using a specified time-based reset function.

Figure 2:
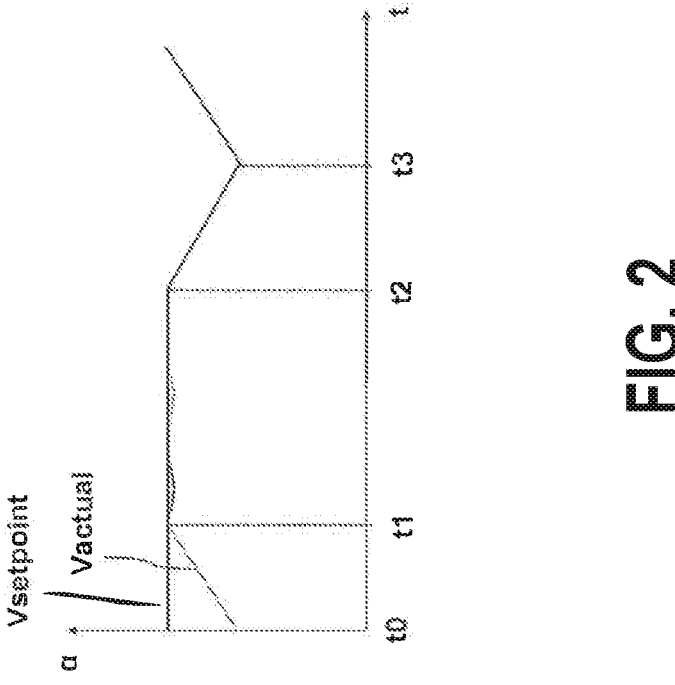
FIG. 2 is a chart illustrating an exemplary progression of a turning angle of the steering wheel of the steer-by-wire system shown in FIG. 1 as a driver enters the vehicle.

FIG. 2 shows a chart of an exemplary progression of a turning angle $\alpha$ of the steering wheel of the steer-by-wire system shown in FIG. 1 as a driver enters the vehicle. The turning angle $\alpha$ is plotted against time t. In this case, a time-based progression Vactual of the current turning angle of the steering wheel illustrated in FIG. 1 is shown. Furthermore, a time-based progression Vsetpoint of a turning angle of a specified predetermined rotational position of the steering wheel is shown.

At the point in time t0, a driver's intention to enter the vehicle and/or a driver's intention to exit the vehicle is detected, for example in that the opening of a driver's door (not shown) of the land vehicle shown in FIG. 1 is electronically detected. Consequently, the land vehicle or the steer-by-wire system 1 is awakened.

Between the points in time t0 and t1, the steering wheel is rotated by the feedback actuator (shown in FIG. 1) into a rotational position which is associated with a current steering position of at least one steerable road wheel (shown in FIG. 1) of the land vehicle.

From the point in time t1 to the point in time t2, the driver uses the steering wheel in such a way that the actuating torque applied to the steering wheel by the driver substantially does not exceed the holding torque applied to the steering wheel by the feedback actuator for the purpose of holding the steering wheel in the predetermined rotational position, or only exceeds it slightly on a couple of occasions.

From the point in time t2 to the point in time t3, the actuating torque applied to the steering wheel by the driver is greater than the holding torque applied to the steering wheel by the feedback actuator, so that the steering wheel is rotated out of its original rotational position, given at the point in time t1, specifically until the driver releases the steering wheel at the point in time t3. Over the time period t2 to t3, a turning angle of the original predetermined rotational position, given at the point in time t1, is continuously approximated to a turning angle of a current rotational position of the steering wheel by use of the electronic control system (not shown in FIG. 2) using a specified time-based adjustment function on the basis of a difference between the actuating torque and the holding torque. Consequently, at the point in time t3, the steering wheel does not snap undesirably back into the original predetermined rotational position given at the point in time t1. Instead, from the point in time t3, the turning angle of the current predetermined rotational position is continuously approximated to the turning angle of the original predetermined rotational position, given at the point in time t1, using a specified time-based reset function.

Figure 3:
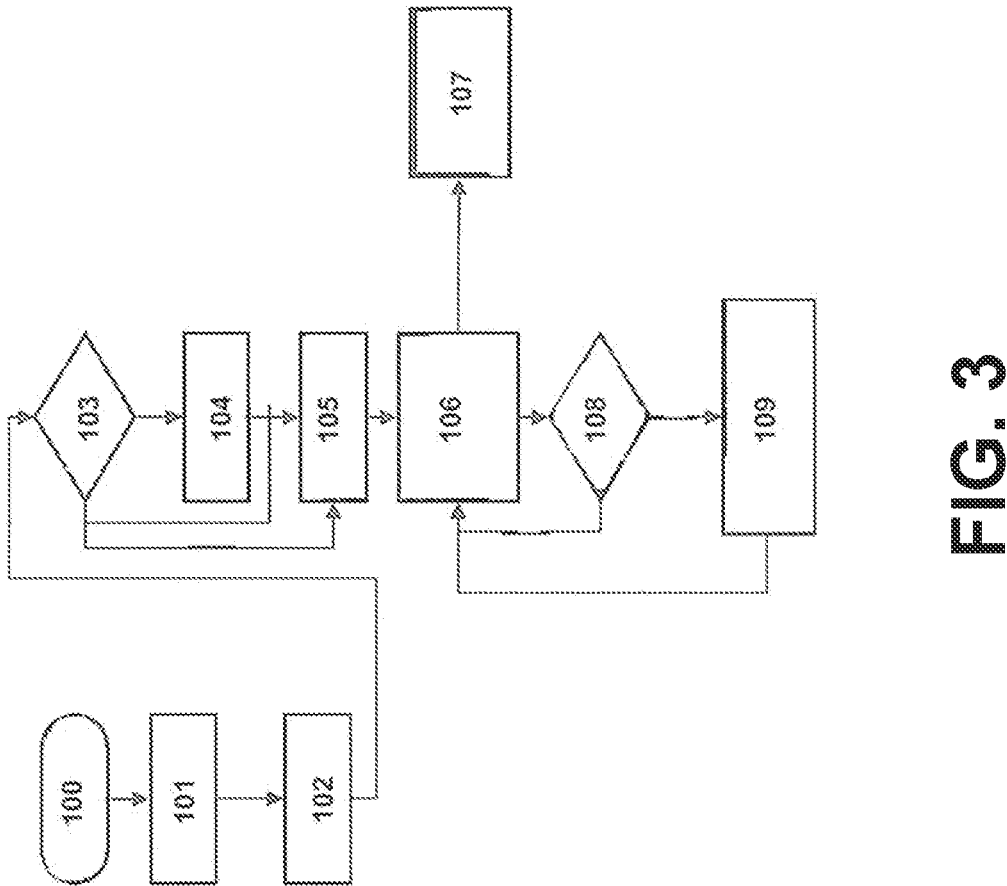
FIG. 3 is a flow diagram illustrating a method for operating the steer-by-wire system, according to an exemplary embodiment.

FIG. 3 shows an illustration of an exemplary embodiment of a method for operating a steer-by-wire system of a land vehicle. The steer-by-wire system may be designed for example according to the exemplary embodiment shown in FIG. 1.

In a starting state 100, the land vehicle is locked and a driver is located outside the land vehicle. In the method step 101, the driver unlocks the land vehicle, which indicates the opening thereof. Consequently, the land vehicle is awakened, whereby the steer-by-wire system is activated in method step 102 so as to be able to support the driver entering the land vehicle by use of the feedback actuator or a holding torque which can be generated thereby at the steering wheel of the land vehicle.

If the driver subsequently opens the driver's door, which can be electronically detected as the driver's intention to enter the vehicle, it is checked in method step 103 whether an offset between a current rotational position of the steering wheel and a rotational position of the steering wheel which is associated with the current steering position of at least one steerable road wheel of the land vehicle exceeds a specified threshold value. If the given offset exceeds the specified threshold value, in method step 104, the steering wheel is rotated by use of the feedback actuator into the rotational position associated with the current steering position of at least one steerable road wheel of the land vehicle. If the given offset does not exceed the specified threshold value, the method step 104 is skipped. The specified threshold value may be a constant >10°, for example an error angle between the current turning angle of the steering wheel and the predetermined turning angle. Alternatively, the specified threshold value may be a function, for example a look-up table, of the predetermined turning angle, wherein maximum permitted error angles are then dependent on the predetermined turning angle, for example 10° in the case of a center position of the steering wheel or predetermined turning angle and 30° in the case of a steering wheel which is located in a stop position of the steering wheel.

In method step 105, the driver grabs the steering wheel in order to use the steering wheel for support when entering the land vehicle. This grabbing of the steering wheel may be electronically detected by the detection device. In method step 106, the feedback actuator is then activated by the electronic control system so that, in method step 107, the feedback actuator holds the steering wheel in a predetermined rotational position by generating a holding torque.

In method step 108, it is checked whether an actuating torque which exceeds the holding torque is manually applied to the steering wheel and whether the steering wheel has consequently been rotated out of the original predetermined rotational position. If the actuating torque does not exceed the holding torque, the method passes to method step 106. If the actuating torque exceeds the holding torque, in method step 109, a new turning angle for the predetermined rotational position is ascertained by the electronic control system on the basis of a difference between the actuating torque and the holding torque and this new turning angle is supplied to method step 106, in which the turning angle of the original predetermined rotational position is then continuously approximated to the turning angle of the current rotational position of the steering wheel, i.e., to the new turning angle, using a specified time-based adjustment function. The specified time-based adjustment function may be given, for example, as follows: New turning angle=last turning angle+(current holding torque–torque request by a position controller (not shown))*proportional control gain of the position controller.

After the approximation of the predetermined rotational position of the steering wheel to the current rotational position of the steering wheel and when the actuating torque is no longer applied to the steering wheel, the turning angle of the current predetermined rotational position may be continuously approximated to the turning angle of the original predetermined rotational position using a specified time-based reset function.

According to the disclosure, the steer-by-wire system, when an actuating torque which exceeds the holding torque is applied manually to the steering wheel and the steering wheel is consequently rotated out of the predetermined rotational position, the electronic control system is equipped to continuously approximate a turning angle of the predetermined rotational position to a turning angle of a current rotational position of the steering wheel using a specified time-based adjustment function on the basis of a difference between the actuating torque and the holding torque.

It should be noted that the features and measures listed individually in the description below may be combined with one another in any technically meaningful manner and demonstrate further configurations of the disclosure. The description additionally characterizes and specifies the steer-by-wire system and method, in particular, in conjunction with the figures.

For this inventive updating of the desired turning angle of the predetermined rotational position to the turning angle of the current rotational position of the steering wheel during an over-rotation of the steering wheel by the driver, the difference between a maximum permitted torque of the feedback actuator and a torque needed to keep the steering wheel stationary may be ascertained in each data processing time step. This torque difference may be ignored by a data processing program if it's very small or is below a specified minimum value. If the torque difference is above this minimum value, the associated torque difference signal may be filtered. The filtered torque difference signal may be multiplied by a constant factor. This factor can be used to determine "how quickly" the steering wheel slips or yields to the driver torque. The greater the factor, the quicker the slip of the steering wheel or the quicker the yield of the steering wheel to the driver torque. The value of the factor can be determined for example in vehicle tests.

The angular offset generated thereby may be added to the desired turning angle of the predetermined rotational position. The desired turning angle of the predetermined rotational position thus approximates ever more closely to the turning angle of the current rotational position of the steering wheel until the torque needed to keep the steering wheel stationary is smaller than the maximum permitted torque of the feedback actuator.

The electronic control system may be equipped to activate the feedback actuator for the inventive purpose as soon as the land vehicle is electronically "awakened." This awakening may be triggered for example by a door being unlocked, by a door being opened or by another electronically detectable event. To this end, the steer-by-wire steering system has the at least one detection device, which is equipped to detect the intention of a driver to enter the vehicle and/or the intention of a driver to exit the vehicle on the basis of such an electronically detectable event occurring. To this end, the detection device may have at least one electronic sensor unit. The steer-by-wire system may also have two or more, in particular also different, sensor units, for example to acquire redundant information from which conclusions as to whether a driver intends to enter the vehicle and/or intends to exit the vehicle can be drawn more accurately.

By electrically controlling the feedback actuator by use of the electronic control system following detection of the intention to enter the vehicle and/or the intention to exit the vehicle in such a way that the feedback actuator holds the steering wheel in the predetermined rotational position by generating a holding torque, a driver may use the steering wheel for support when entering and exiting the vehicle, which makes it easier to enter and exit the vehicle.

If, when entering and exiting the vehicle, the driver applies an actuating torque to the steering wheel which is greater than the, in particular maximum, holding torque which can be generated by the feedback actuator, the steering wheel is rotated out of the original predetermined rotational position. To subsequently prevent the steering wheel from rotating back into the original predetermined rotational position as soon as the driver releases the steering wheel, the electronic control system continuously approximates the turning angle of the original predetermined rotational position to the turning angle of a current rotational position of the steering wheel using a specified time-based adjustment function on the basis of a difference between the actuating torque and the holding torque. Consequently, the steering wheel, after it has been released by the driver, only passes through a relatively small turning angle range, if any, to snap back into the approximated or newly determined rotational position, which makes the inventive steer-by-wire system significantly more comfortable.

The control of the steer-by-wire system may be realized completely by an algorithm or routine, which is implemented for example in an existing electronic control system of a steer-by-wire system. Consequently, the steer-by-wire system and method can be realized in an efficient manner, for example also in a retrofitting procedure.

The steer-by-wire system may furthermore have at least one electrically controllable steering actuator for controlling the turning angle of at least one steerable road wheel of the land vehicle. Furthermore, the steer-by-wire system may have at least one turning angle sensor, with which a turning angle of the steering wheel of the land vehicle can be detected. The steering actuator may be controlled on the basis of electrical signals of the turning angle sensor. In a driving operation of the land vehicle, the feedback actuator may drive the steering wheel in order to generate a feedback torque at the steering wheel for a driver of the land vehicle.

The disclosure also relates to a land vehicle having an inventive steer-by-wire system. The land vehicle may be, for example, an automobile or a utility vehicle.

According to an advantageous configuration, following detection of the driver's intention to enter the vehicle and/or the driver's intention to exit the vehicle, the electronic control system is equipped to set a current rotational position of the steering wheel as a predetermined rotational position. Consequently, the driver does not have to wait until the feedback actuator has rotated the steering wheel into the predetermined rotational position before he may use the steering wheel for support when entering or exiting the vehicle.

According to a further advantageous configuration, following detection of the driver's intention to enter the vehicle and/or the driver's intention to exit the vehicle, the electronic control system is equipped to set a rotational position of the steering wheel which is associated with a current steering position of at least one steerable road wheel of the land vehicle as a predetermined rotational position. Consequently, it may be ensured that the steering wheel, when starting the land vehicle, is aligned according to the current steering position of the steerable road wheel. Otherwise, an offset between the predetermined rotational position of the steering wheel and the current steering position of the steerable road wheel would have to be eliminated by other means after the driver has entered the vehicle.

According to a further advantageous configuration, after the approximation of the predetermined rotational position to the current rotational position and when the actuating torque is no longer applied to the steering wheel, the electronic control system is equipped to continuously approximate the turning angle of the current predetermined rotational position to the turning angle of the original predetermined rotational position using a specified time-based reset function. The time-based reset function may be a ramp function, for example. In this case, the ramp rate may be adjustable, for example using angle errors or other inputs, in order to achieve a smooth return of the steering wheel to the original predetermined rotational position. The "first rotational position of the steering wheel" (the rotational position of the steering wheel which corresponds to the turning angle of the steerable wheels) may be stored as the "target position." For the inventive updating of the desired turning angle of the predetermined rotational position to the turning angle of the current rotational position of the steering wheel during an over-rotation of the steering wheel by the driver, an additional term Aa may now be added in the specified time-based reset function (adjustment function). This term Aa, like the adjustment function, may be added to the desired turning angle of the predetermined rotational position in each data processing time step, whereby the steering wheel is rotated slowly back to the target position when the steering wheel is not in the predetermined rotational position and is not held by the driver. If the driver is holding the steering wheel or rotating it away, the adjustment function may be greater than the term Aa and the over-rotation of the steering wheel by the driver may therefore still ensue. The term Aa may be calculated as function of the difference between the current rotational position and the target position. A look-up table many be used as a function, wherein, for example, a distance from the target position may be input into the look-up table, for example in order to realize a slower rotation of the steering wheel when it is close to the target position. Alternatively or additionally, multipliers, constants or filters may be used. One condition may be that only small values are calculated so that the steering wheel is not rotated back too quickly, and the adjustment function prevails in the event of an over-rotation of the steering wheel, and that the term Aa is equal to zero when the current turning angle of the steering wheel corresponds approximately to the target position.

The disclosure sets forth a method which, when an actuating torque which exceeds the holding torque is applied manually to the steering wheel and the steering wheel is consequently rotated out of the predetermined rotational position, a turning angle of the predetermined rotational position is continuously approximated to a turning angle of a current rotational position of the steering wheel using a specified time-based adjustment function on the basis of a difference between the actuating torque and the holding torque.

The advantages mentioned above in relation to the steer-by-wire system are associated accordingly with the method. In particular, the steer-by-wire system may be used to carry out the method according to one of the above-mentioned configurations or a combination of at least two of these configurations.

According to an advantageous configuration, following detection of the driver's intention to enter the vehicle and/or the driver's intention to exit the vehicle, a current rotational position of the steering wheel is set as a predetermined rotational position. The advantage mentioned above in relation to the corresponding configuration of the steer-by-wire system is associated accordingly with this configuration.

According to a further advantageous configuration, following detection of the driver's intention to enter the vehicle and/or the driver's intention to exit the vehicle, a rotational position of the steering wheel which is associated with a current steering position of at least one steerable road wheel of the land vehicle is set as a predetermined rotational position. The advantage mentioned above in relation to the corresponding configuration of the steer-by-wire system is associated accordingly with this configuration.

According to a further advantageous configuration, after the approximation of the predetermined rotational position to the current rotational position and when the actuating torque is no longer applied to the steering wheel, the turning angle of the current predetermined rotational position is continuously approximated to the turning angle of the original predetermined rotational position using a specified time-based reset function. The advantage mentioned above in relation to the corresponding configuration of the steer-by-wire system is associated accordingly with this configuration.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A steer-by-wire system for a vehicle, the steer-by-wire system comprising:
  a steering wheel;
  a feedback actuator operatively coupled to the steering wheel;
  a detection device configured to detect a driver's intention to enter the vehicle or to exit the vehicle; and
  an electronic control system, which, following detection of the intention to enter or exit the vehicle, is configured to electrically control the feedback actuator to hold the steering wheel in a predetermined rotational position by generating a holding torque, wherein when an actuating torque which exceeds the holding torque is applied manually to the steering wheel and the steering wheel is consequently rotated out of the predetermined rotational position, the electronic control system is configured to continuously approximate a turning angle of the predetermined rotational position to a turning angle of a current rotational position of the steering wheel.

2. The steer-by-wire system according to claim 1, wherein the electronic control system is configured to continuously approximate the turning angle based on a difference between the actuating torque and the holding torque.

3. The steer-by-wire system according to claim 2, wherein the electronic control system continuously approximates the turning angle using a specified time-based adjustment function.

4. The steer-by-wire system according to claim 1, wherein following detection of the driver's intention to enter or exit the vehicle, the electronic control system is configured to set a current rotational position of the steering wheel as the predetermined rotational position.

5. The steer-by-wire system according to claim 1, wherein following detection of the driver's intention to enter or exit the vehicle, the electronic control system is configured to set a rotational position of the steering wheel which is associated with a current steering position of at least one steerable road wheel of the land vehicle as the predetermined rotational position.

6. The steer-by-wire system according to claim 1, wherein after the approximation of the predetermined rotational position to the current rotational position and when the actuating torque is no longer applied to the steering wheel, the electronic control system is configured to continuously approximate the turning angle of the current predetermined rotational position to the turning angle of the original predetermined rotational position using a specified time-based reset function.

7. The steer-by-wire system according to claim 1, wherein the vehicle is a land vehicle.

8. A method for operating a steer-by-wire system of a vehicle, the method comprising:
  detecting a driver's intention to enter or exit the vehicle;
  following detection of the intention to enter or exit the vehicle, holding a steering wheel of the steer-by-wire system in a predetermined rotational position by use of a feedback actuator of the steer-by-wire system through the generation of a holding torque, wherein the feedback actuator is operatively coupled to the steering wheel; and
  when an actuating torque which exceeds the holding torque is applied manually to the steering wheel and the steering wheel is consequently rotated out of the predetermined rotational position, continuously approximating a turning angle of the predetermined rotational position to a turning angle of a current rotational position of the steering wheel.

9. The method according to claim 8, wherein the step of continuously approximating the turning angle is based on a difference between the actuating torque and the holding torque.

10. The method according to claim 9, wherein the step of continuously approximating the turning angle uses a specified time-based adjustment function.

11. The method according to claim 8 further comprising following detection of the driver's intention to enter or exit the vehicle, setting a current rotational position of the steering wheel as the predetermined rotational position.

12. The method according to claim 8 further comprising following detection of the driver's intention to enter or exit the vehicle, setting a rotational position of the steering wheel which is associated with a current steering position of at least one steerable road wheel of the land vehicle as the predetermined rotational position.

13. The method according to claim 8 further comprising after the approximation of the predetermined rotational position to the current rotational position and when the actuating torque is no longer applied to the steering wheel, continuously approximating the turning angle of the current predetermined rotational position to the turning angle of the original predetermined rotational position using a specified time-based reset function.

14. The method according to claim 8, wherein the vehicle is a land vehicle.

* * * * *